United States Patent Office 2,928,425
Patented Mar. 15, 1960

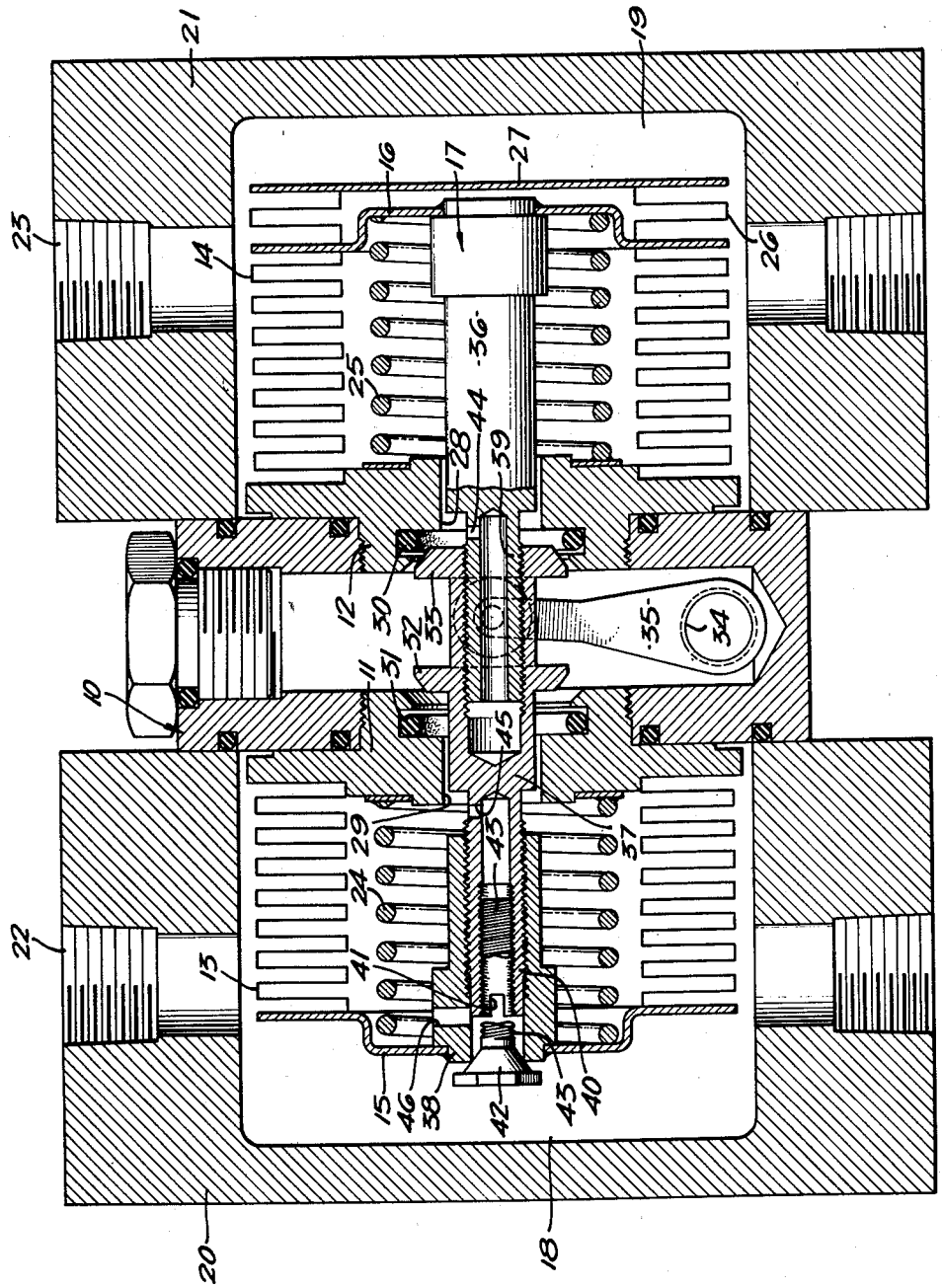

2,928,425

ADJUSTMENT FOR VALVE CLOSURE OF DIFFERENTIAL PRESSURE RESPONSIVE MECHANISM

George Miller, Monterey Park, Calif., assignor to Barton Instrument Corporation, Monterey Park, Calif., a corporation of California Application June 23, 1958, Serial No. 743,680

3 Claims. (Cl. 137—786)

This invention relates to improvements in devices which are responsive to differentials in pressures.

Explanatory of the present invention there have heretofore been designed differential pressure responsive devices consisting essentially of a central partition on the opposite sides of which there are metallic bellows. These bellows are disposed in chambers to which the pressures between which a differential may exist are transmitted. A passage is formed in the partition and a rigid stem connects the outer or movable ends of the bellows to cause them to move in unison in response to the differential in pressures that may exist in the two chambers. Opposed valve seats are formed in the passages and opposed valve closures are mounted on the stem adapted to seat on the valve seats. The interiors of the bellows are first evacuated and then are completely filled with a liquid which being relatively incompressible, will become entrapped by the seating of a valve closure on its valve seat when the differential in pressures becomes excessive to prevent collapse or destruction of the instrument when it is subjected to a pressure differential beyond its range. A torque tube having a crank thereon that is operatively connected to the rigid stem transmits movements of the stem to the exterior of the device when subjected to pressure differentials within its range.

Although instruments of this character are precisely made and are carefully assembled there are nevertheless inherent differences in the elements of the construction which, when the assembly is completed, cause the positions of the valve closures with respect to their seats to vary. Thus, in one assembly the inherent resiliency of the metal of one bellows may be different from the inherent resiliency in the metal of its opposed bellows. The compression springs which are usually disposed within the bellows and urge them outwardly may not be exactly balanced. The effect of the torque tube on the assembly may also be a contributing factor and the exact manner in which the ends of the rigid stem are connected to the outer ends of the bellows may also contribute to moving a valve closure toward or away from its seat.

It is therefore desirable in an instrument of this character to complete the assembly of all parts of the construction and to then axially adjust the valve closures on the rigid stem to their proper positions with relation to their seats without disturbing or altering the overall length of the rigid stem.

An object of the present invention is to provide a device responsive to a differential in pressures of this character wherein all elements of the construction can be assembled together and an adjustment of the valve closures with respect to their seats can be easily and quickly accomplished without affecting the overall length of the stem.

While the invention has been primarily designed for a pressure differential responsive device employing two opposed bellows arranged on opposite sides of a central partition and in their respective pressure chambers, it is equally applicable to a pressure differential responsive device employing only a single bellows.

With the foregoing and other objects in view, which will be made manifest in the following detailed description and specifically pointed out in the appended claims, reference is had to the accompanying drawing for an illustrative embodiment of the invention, wherein:

The figure is a diametrical section through a pressure differential responsive device embodying the present invention.

Referring to the accompanying drawing wherein similar reference characters designate similar parts throughout, the pressure differential device illustrated comprises a central partition generally indicated at 10 into which is threaded the bases 11 and 12 of two opposed metallic bellows 13 and 14. These bellows have their outer or movable ends 15 and 16, respectively, rigidly connected to each other by means of a rigid stem generally indicated at 17. The bellows 13 and 14 are disposed within pressure chambers 18 and 19 that are formed in housings 20 and 21 that are bolted or otherwise secured to the sides of the partition 10. The pressures between which a differential may exist are transmitted to the chambers 18 and 19 through inlets 22 and 23, respectively. Compression springs 24 and 25 are usually disposed within the bellows and bear on the bellows bases 11 and 12 and on the movable end caps 15 and 16, respectively. Usually, one of the bellows, such as the bellows 14 is equipped with an additional temperature compensating bellows 26 having a movable end 27 and the interior of this bellows is in communication through a small aperture, not shown, in the end cap 16 with the interior of bellows 14. This bellows merely enables expansion and contraction of the liquid confined within the bellows 13 and 14 to take place without affecting the calibration of the instrument when variations in temperature occur. The rigid stem 17 extends through passages 28 and 29 in the bellows bases 11 and 12, and consequently, extends through the partition 10. In the passages 28 and 29 there are opposed valve seats preferably provided by loosely confined rubber O-rings 30 and 31. On the stem 17 there are opposed valve closures 32 and 33, one of which is adapted to seat on its seat when the differential in pressures in the chambers 18 and 19 becomes excessive and beyond the range of the instrument. When the closure seats it tends to confine or entrap liquid in the bellows to prevent collapse of the bellows under the excessive pressure. A torque tube indicated at 34 having a crank 35 thereon is operatively connected to the stem 17 and serves to transmit movements of the rigid stem 17 to the exterior of the instrument when the stem is moved axially in response to differential pressures within the range of the instrument.

As previously explained, although instruments of this character are precisely made and assembled there are inherent differences in the structures. Thus, the resiliency of the metal of the bellows 13 may be different from that of the resiliency of the metal of the bellows 14. The strengths of the springs 24 and 25 may differ slightly from each other and the resiliency of the metal of the torque tube 34 may differ from one instrument to the next. All of these factors in certain instruments may collectively tend to shift the stem 17 toward the right as viewed in the figure and could be regarded as plus factors. In a duplicate instrument conditions might be such that all of the factors collectively would tend to shift the stem 17 toward the left, and under these circumstances they might be regarded as minus factors. In still other instruments some of these factors may be regarded as plus factors and others as minus factors and have some tendency to neutralize or balance each other, but if some of these factors are of considerable magnitude whereas others are of little, if any, magnitude, it is readily apparent that the exact positions of the closures 32 and 33 with respect to their seats 31 and 30 can rarely if ever be accurately predetermined.

In accordance with the present invention the stem 17 is divided into three parts 36, 37, and 38. The part 36 which is anchored to the movable end cap 16 of bellows 14 has a hollow threaded extension 39 that is threaded into part 37 which carries the valve closures 32 and 33. In a similar manner, part 37 has a tubular threaded extension 40 which is threaded into part 38 which is fastened to the end cap 15 of bellows 13.

The threads on the two tubular extensions 39 and 40 are identical or at least have the same pitch. The tubular extension 40 is equipped at its end with a screwdriver kerf or the equivalent indicated at 41 which is exposed when the conical closure 42 and its threaded stem 43 are removed from the end of the part 38. Consequently, with this arrangement, after the entire structure has been assembled together and it is found as a result of the various factors that stem 17 has been displaced, either to the right or to the left of its intended position, and the closures 32 and 33 are improperly arranged or positioned with respect to their respective seats 31 and 30, it is possible on removal of the closure 42 to rotate part 37, thus shifting or adjusting the closures 32 and 33 axially of the stem 17. During this adjustment, by reason of the fact that the threads on the two extensions 39 and 40 are identical, it will be appreciated that the overall length of the stem 17 is in no way altered or changed. When the closure 42 is re-applied after the adjustment the tightening of the closure causes the stem 43 to impose a tension on the extension 40 and function somewhat as a jamb nut to lock part 37 in adjusted position.

In the preferred form of construction vents or bleed ports 44, 45, and 46 are provided to prevent air from becoming entrapped in the extensions and in the part 38 when the interiors of the bellows are evacuated and are filled with liquid.

It will thus be appreciated that by making the rigid stem 17 in three parts the middle part of which carries the valve closures 32 and 33 and having these parts connected together by identical threads, that axial adjustment of the closures 32 and 33 along the length of the stem can be easily and quickly accomplished by rotating the middle part 37 by means of its screw-driver kerf 41.

While the invention has been primarily designed for use with a differential pressure responsive device employing two opposed bellows connected to each other by a rigid stem, it will be appreciated by those skilled in the art that it is equally applicable to a pressure differential responsive device employing only a single bellows such as the bellows 13. In such forms of construction it is merely necessary to utilize some means, such as the spring 25, to hold part 36 or its equivalent against rotating while the adjustment is being effected.

Various changes may be made in the details of construction without departing from the spirit and scope of the invention as defined by the appended claims.

I claim:

1. In a device which is responsive to a differential in pressures, liquid filled bellows mounted on opposite sides of a partition therebetween, a passage in the partition, a stem rigidly connecting the movable ends of the bellows through the passage, opposed valve seats in the passage, opposed valve closures on the stem one of which is adapted to seat upon its seat to entrap liquid in one bellows when the differential in pressures becomes excessive, said stem being formed of three parts threadedly connected to each other with threads of the same pitch, said valve closures being on the middle part whereby by rotating the middle part the axial position of the closures can be adjusted without altering the overall length of the stem.

2. In a device which is responsive to a differential in pressures, liquid filled bellows mounted on opposite sides of a partition therebetween, a passage in the partition, a stem rigidly connecting the movable ends of the bellows through the passage, opposed valve seats in the passage, opposed valve closures on the stem one of which is adapted to seat upon its seat to entrap liquid in one bellows when the differential in pressures becomes excessive, said stem being formed of three parts threadedly connected to each other with threads of the same pitch, the middle part being accessible for rotation relatively to the other parts adjacent one end of the stem and having the valve closures thereon.

3. In a device which is responsive to a differential in pressures, liquid filled bellows mounted on opposite sides of a partition therebetween, a passage in the partition, a stem rigidly connecting the movable ends of the bellows through the passage, opposed valve seats in the passage, opposed valve closures on the stem one of which is adapted to seat upon its seat to entrap liquid in one bellows when the differential in pressures becomes excessive, said stem being formed of three parts threadedly connected to each other with threads of the same pitch, the middle part being accessible for rotation relatively to the other parts adjacent one end of the stem and having the valve closures thereon, there being bleed ports for bleeding the holes into which the parts of the stem are threaded.

References Cited in the file of this patent

UNITED STATES PATENTS

| | | |
|---|---|---|
| 2,590,324 | Jones | Mar. 25, 1952 |
| 2,688,339 | Dexter | Sept. 7, 1954 |
| 2,705,021 | Wiley | Mar. 29, 1955 |
| 2,762,392 | Reese | Sept. 11, 1956 |